O. D. JOHANTGEN.
RACK BAR AND BEARING FOR CALCULATING MACHINES AND THE LIKE.
APPLICATION FILED JULY 1, 1919.
1,378,119.  Patented May 17, 1921.
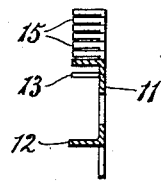
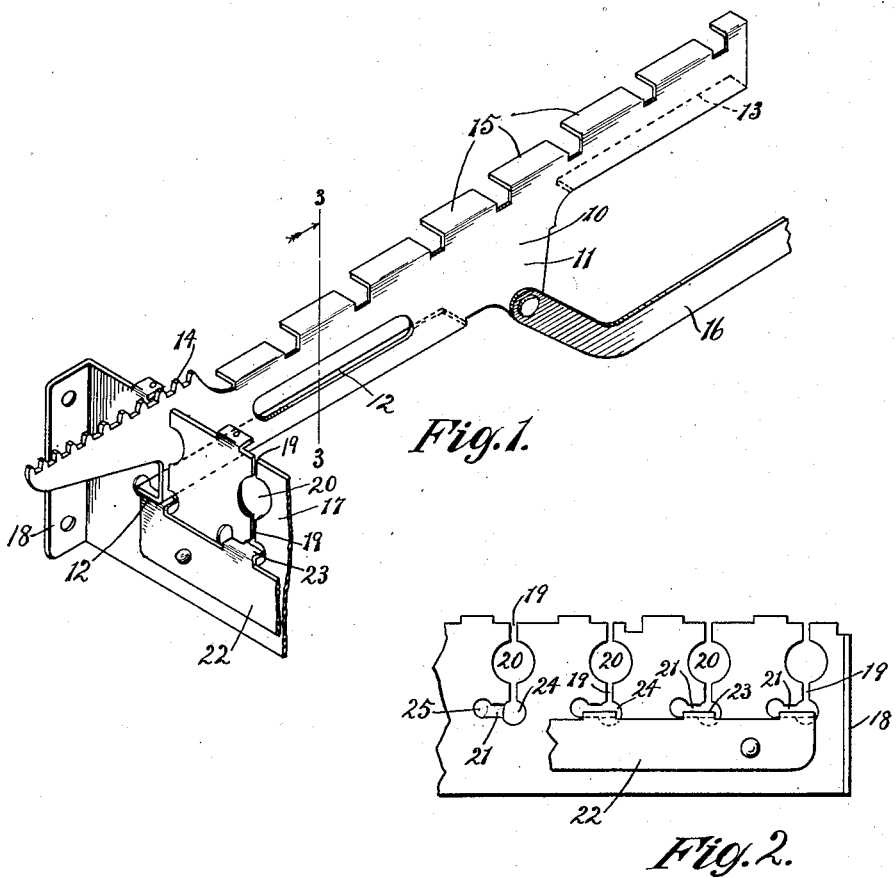
Inventor:
Oliver D. Johantgen
By Gillson & Gillson
Attys

UNITED STATES PATENT OFFICE.

OLIVER D. JOHANTGEN, OF CHICAGO, ILLINOIS, ASSIGNOR TO VICTOR ADDING MACHINE CO., OF CHICAGO, ILLINOIS, A CORPORATION OF ILLINOIS.

RACK-BAR AND BEARING FOR CALCULATING-MACHINES AND THE LIKE.

1,378,119.  Specification of Letters Patent.  Patented May 17, 1921.

Original application filed January 4, 1918, Serial No. 210,301. Divided and this application filed July 1, 1919. Serial No. 307,941.

*To all whom it may concern:*

Be it known that I, OLIVER D. JOHANTGEN, a citizen of the United States, and resident of Chicago, county of Cook, and State of Illinois, have invented certain new and useful Improvements in Rack-Bars and Bearings for Calculating-Machines and the like, of which the following is a specification, and which are illustrated in the accompanying drawings, forming a part thereof.

This application is a division of a copending application filed by Oliver D. Johantgen, January 4, 1918,- Serial No. 210,301, for improvements in listing machines.

An object of the invention is the provision of parts of an adding or listing machine so formed and organized that they may be made from inexpensive metal stampings and yet function properly without being smoothed and finished carefully after being punched and pressed to shape.

For purposes of illustration a single rack bar of a calculating machine and a detail of one of the end bearing plates in which the said rack bar slides are shown in the accompanying drawings, in which:

Figure 1 is a perspective view of the said parts,

Fig. 2 is a detail front elevation of the said bearing plate, the rack bar being omitted, and Fig. 3 is a vertical transverse sectional view of the rack bar taken on the line 3—3 of Fig. 1.

The rack bar 10 is preferably stamped and pressed from a single piece of sheet metal. As shown, it comprises a web 11 with lower flanges 12 and 13, both turned in the same direction but located in different portions of the length of the bar. To operate the corresponding accumulator gear wheel (not shown), rack teeth 14 are formed along the upper edge of the bar 10 adjacent one end of the same and stepped projections 15, each having the form of a short flange turned in the same direction as the lower flanges 12 and 13, are arranged along the upper edge of the bar throughout the remainder of its length. The stepped projections 15 of the rack bar coöperate with the key stems (not shown), of the adding or listing machine in the manner disclosed in my said pending application for patent on listing machine. Link 16, connected to rack bar 10 intermediate its ends and extending rearwardly beyond the bar, is for the purpose of operating the listing mechanism. The rack bar 10 is slidingly supported adjacent its opposite ends in bearing plates, as 17, only one of which is shown. This bearing plate preferably constitutes one of the frame members of the machine and for attachment to the other frame members it has forwardly turned end flanges, as 18. For maintaining the rack bar in upright position, its web 11 is extended through a vertical slot, as 19 in the bearing plate 17, the said slot being preferably formed with an enlargement or opening 20 midway of the height of the same.

The corresponding lower flange, as 12, of the rack bar 10 is also extended and reciprocates through a slot 21 in the bearing plate 17, said slot being arranged at right angles to guide slot 19. When such a slot, as 21, is produced in a sheet metal part by punching, the edges of the slot are usually more or less rough due to the shearing out of the punching dies. If the rack bar should be caused to reciprocate directly on these edges, it would be necessary to perform expensive smoothing and finishing operations to avoid excessive friction and rapid wear of the rack bar flange. This finishing is rendered unnecessary by the provision of a supplemental bearing plate, as 22, having a horizontally turned projection 23 which enters the slot 21 of the bearing plate 17 and provides the wearing surface upon which the said flange of the rack bar slides. As shown, the supplemental bearing plate 22 is secured against the front face of the bearing plate 17 and is provided with a plurality of the said projections 23 equal in number with and correctly spaced to lie within the slots 21 provided for the flanges of the number of rack bars, as 10, which may be used.

If the slots 19 and 21 were of uniform width throughout, including the angle where the slots come together, the roughness of the slot edges and the necessary slight rounding of the corner between the web 11 and flange 12 of the rack bar 10 would result in excessive friction in spite of the bearing plate projection 23, while the roughness of the edge of the flange 12 would wear the adjacent edge of the slot. For this reason the slot 21 is widened both where it joins slot 19 and at its outer end, by the formation of perforations 24 and 25 at these points. With this construction it will be seen that the angle between the web 11 and flange 12 of the rack bar will be clear of the slot and perforation edges, and that the outer edge of flange 12 projects beyond the bearing projection 23 into perforation 25 but does not extend to the walls of this perforation.

I claim as my invention:

1. In an adding machine, in combination, a sliding rack bar having a web and a flange, a guide plate having a slot for receiving the said flange of the rack bar, and a bearing plate carried by the guide plate and having a portion projecting into said slot under the flange to serve as a bearing therefor.

2. A sheet metal rack bar bearing for calculating machines and the like, comprising, in combination, a guide plate having a slot, and a bearing plate carried by the guide plate, said bearing plate being of less thickness than the width of the slot and lying in said slot to provide a smooth wearing surface for a part moving in the slot.

3. In a machine of the class described, a sheet metal member having a slot and an opening at one end of said slot forming an enlargement thereof and a plate of less thickness than the width of said slot secured to said member and having a projection entering said slot, whereby a reciprocating member acting in said slot will be protected from roughness of the slot edge.

4. In a machine of the class described, in combination, a sheet metal guide member having a slot which is enlarged at one end thereof, a plate of less thickness than said slot fastened to said member and having a bearing projection entering the slot and a reciprocating member acting in said slot and bearing on said projection with its edge extending into the slot enlargement beyond said projection whereby said reciprocating member is protected from roughness of said slot edge and said bearing projection is not affected by roughness of edge of said reciprocating member.

5. In a machine of the class described, in combination, a reciprocating rack bar having a right angled flange extending along its lower edge, a frame member having an L-shaped slot for guidance of said rack bar during reciprocation, said slot being enlarged at its angle and at its horizontal termination, the length of the horizontal extension of the slot and enlargements being greater than the width of said rack bar flange, a plate of less thickness than said slot provided with an angularly bent projection registering with the horizontal portion of the slot and of less width than the length of said slot portion and enlargements, said plate being secured against the face of the frame member with its projection entering the slot and so located that the edge of the flange of the rack bar will be free of the edge of the projection of the plate.

6. A rack bar bearing for calculating machines and the like comprising, in combination, a member having a slot therein said slot being enlarged at each end, a reciprocating part acting in said slot with longitudinal edges in the enlargements of the slot, and means to guide said part in its reciprocation with its edges out of contact with said member.

7. A rack bar for calculating machines and the like comprising an elongated sheet metal plate having an integral flange at the bottom thereof formed by bending the material of the plate at an angle to the body thereon, a series of stops at the top of the plate at different elevations from the said bottom flange, each of the said stops being an integral portion of the material of the plate at an angle to the body of the plate and a set of rack teeth extending along the plate.

8. A rack bar for calculating machines and the like comprising an elongated sheet metal plate having a right angled flange at the bottom thereof formed of the material of the plate and a set of stops at successively increasing heights above said flange formed by bending portions of the material of the plate at an angle thereto.

9. A rack bar bearing for calculating machines and the like comprising, in combination, a member having a slot therein, said slot being enlarged at one end, a reciprocating part acting in said slot with one of its longitudinal edges in the slot enlargement, and means for guiding said part in its reciprocation with its said longitudinal edge out of contact with the walls of the slot enlargement.

10. A rack bar for calculating machines and the like comprising an elongated sheet metal plate of variable width having integral bearing flanges extending along the lower edge of the plate at different elevations adjacent its opposite ends, each of said flanges being formed by bending the material of the plate at an angle to the body thereof, a series of stops extending along the top of the plate from one end of the same but not extending to the other end of the plate, the said stops being at different elevations with respect to said bearing flanges and each of the stops being formed by bending an integral portion of the material of the plate at an angle to the body thereof, and a set of rack teeth extending along the upper edge of the plate adjacent the last mentioned end of the same.

11. A sheet metal rack bar bearing for calculating machines and the like, comprising, in combination, a guide plate having a slot, a bearing plate carried by the guide plate projecting from one side of the slot beyond the surface of the guide plate, whereby a bearing is provided of greater extent than the thickness of the guide plate and without punched edge roughness on the wearing surface.

OLIVER D. JOHANTGEN.